US011983657B2

(12) United States Patent
Carpenter

(10) Patent No.: US 11,983,657 B2
(45) Date of Patent: May 14, 2024

(54) MULTI-TIERED CAROUSEL FOR STORAGE AND SEQUENCING OF BAGGAGE

(71) Applicant: Siemens Logistics LLC, DFW Airport, TX (US)

(72) Inventor: Michael D. Carpenter, Arlington, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 786 days.

(21) Appl. No.: 17/106,948

(22) Filed: Nov. 30, 2020

(65) Prior Publication Data

US 2021/0174465 A1   Jun. 10, 2021

Related U.S. Application Data

(60) Provisional application No. 62/944,771, filed on Dec. 6, 2019.

(51) Int. Cl.
| | |
|---|---|
| *G07C 11/00* | (2006.01) |
| *B64F 1/36* | (2017.01) |
| *G05B 19/4155* | (2006.01) |
| *G06Q 10/0631* | (2023.01) |
| *G06Q 10/08* | (2023.01) |
| *G06Q 50/14* | (2012.01) |

(52) U.S. Cl.
CPC ............ *G06Q 10/08* (2013.01); *B64F 1/368* (2013.01); *G05B 19/4155* (2013.01); *G06Q 10/0631* (2013.01); *G06Q 50/14* (2013.01); *G07C 11/00* (2013.01); *G05B 2219/45054* (2013.01); *G07C 2011/04* (2013.01)

(58) Field of Classification Search
CPC .... B64F 1/368; G06Q 50/28; G06Q 10/0631; G06Q 50/14; G05B 19/4155; G05B 2219/45054; G07C 11/00; G07C 2011/04
See application file for complete search history.

(56) References Cited

U.S. PATENT DOCUMENTS 3,776,395 A * 12/1973 Lingg .................... B64F 1/368
                                                        414/928
4,227,607 A * 10/1980 Malavenda ............ B64F 1/368
                                                        198/572

(Continued)

FOREIGN PATENT DOCUMENTS

WO    WO-2011141450 A1 * 11/2011 .............. B64F 1/368

*Primary Examiner* — Patrick H Mackey

(57) ABSTRACT

A baggage handling system includes a multi-tiered carousel system, an input conveyor system, an output conveyor system and a control system. Each tier of the multi-tiered carousel system includes an array of addressable storage cells movable along a loop having a charge point and a discharge point. Each storage cell is configured to store a single baggage item. The input conveyor system transfers baggage items selectively to the addressable storage cells of the multiple tiers at the respective charge points, for storage therein. The output conveyor system retrieves baggage items selectively from the addressable storage cells of the multiple tiers at the respective discharge points and conveys the retrieved baggage items in a queue. The storage and retrieval of baggage items is controlled by the control system such that the retrieved baggage items are queued to conform to a determined sequence.

11 Claims, 5 Drawing Sheets

(56) References Cited

U.S. PATENT DOCUMENTS

| | | | | |
|---|---|---|---|---|
| 5,842,555 | A * | 12/1998 | Gannon | B64F 1/368 |
| | | | | 198/349.5 |
| 6,580,046 | B1 * | 6/2003 | Koini | B64F 1/368 |
| | | | | 700/226 |
| 6,789,660 | B1 * | 9/2004 | Bruun | B65G 1/0407 |
| | | | | 198/370.01 |
| 7,270,226 | B2 * | 9/2007 | Ostrom | B65G 47/5113 |
| | | | | 198/347.4 |
| 7,325,497 | B2 * | 2/2008 | Ben-Ezra | B64F 1/368 |
| | | | | 104/88.01 |
| 8,556,084 | B1 * | 10/2013 | Snook | B65G 47/51 |
| | | | | 209/583 |
| 10,279,911 | B2 * | 5/2019 | Murphy | B65G 1/10 |
| 10,643,294 | B2 * | 5/2020 | Murphy | A45C 13/385 |
| 10,946,983 | B2 * | 3/2021 | Svenningsen | B64F 1/368 |
| 2018/0155059 | A1 * | 6/2018 | Thogersen | B65G 1/1375 |

* cited by examiner

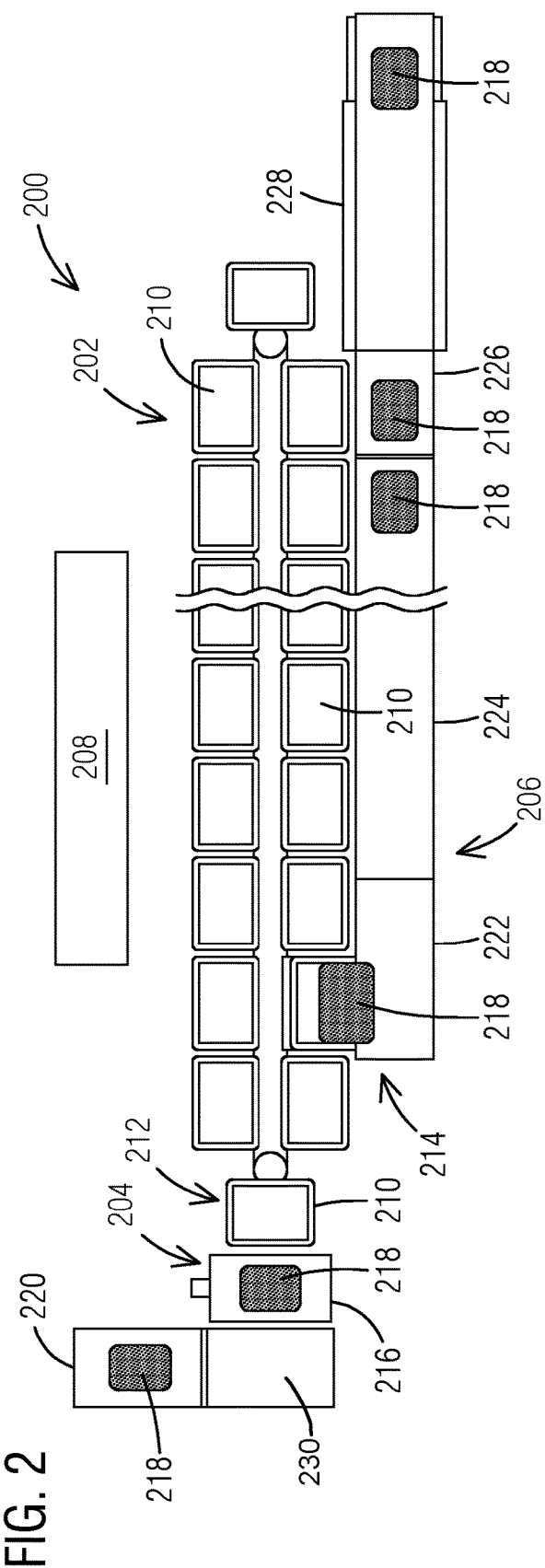

MULTI-TIERED CAROUSEL FOR STORAGE AND SEQUENCING OF BAGGAGE

CROSS REFERENCE TO RELATED APPLICATIONS

This application claims priority to the U.S. provisional application No. 62/944,771 filed Dec. 6, 2019, which is incorporated by reference herein in its entirety.

TECHNICAL FIELD

The present disclosure is directed, in general, to baggage processing, and more specifically, to a system and method for storage and sequencing of baggage.

BACKGROUND

Airport baggage services include handling systems that process passenger checked luggage from check-in (or sometimes from transfer) to loading aboard passenger aircraft. The processing of baggage within baggage handling systems at medium to large airports tends to be highly automated up to the point at which bags are accumulated for a particular flight and loaded into either carts or unit load devices (ULDs).

SUMMARY

A first aspect of the disclose sets forth a baggage handling system. The baggage handling system comprises a carousel system comprising multiple tiers of carousels arranged at different heights, each tier comprising an array of addressable storage cells movable along a loop having a charge point and a discharge point, each storage cell configured to store a single baggage item. The baggage handling system further comprises an input conveyor system configured to transfer baggage items selectively to the addressable storage cells of the multiple tiers at the respective charge points, for storage therein. The baggage handling system further comprises an output conveyor system configured to retrieve baggage items selectively from the addressable storage cells of the multiple tiers at the respective discharge points and convey the retrieved baggage items in a queue. The baggage handling system further comprises a control system configured to control the storage and retrieval of baggage items such that the retrieved baggage items are queued to conform to a determined sequence.

A second aspect of the disclose sets forth a method for handling baggage at an airport. The method comprises operating a carousel system comprising multiple tiers of carousels arranged at different heights, each tier comprising an array of addressable storage cells movable along a loop having a charge point and a discharge point, each storage cell configured to store a single baggage item. The method comprises transferring baggage items selectively to the addressable storage cells of the multiple tiers at the respective charge points, for storage therein. The method further comprises retrieving baggage items selectively from the addressable storage cells of the multiple tiers at the respective discharge points and conveying the retrieved baggage items in a queue. The method further comprises controlling the storage and retrieval of baggage items such that the retrieved baggage items retrieved are queued to conform to a determined sequence.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

FIG. 2 illustrates a plan view of a baggage handling system according to a first embodiment.

FIG. 3 illustrates an elevation view of the baggage handling system shown in FIG. 2.

DETAILED DESCRIPTION

Figure 1:
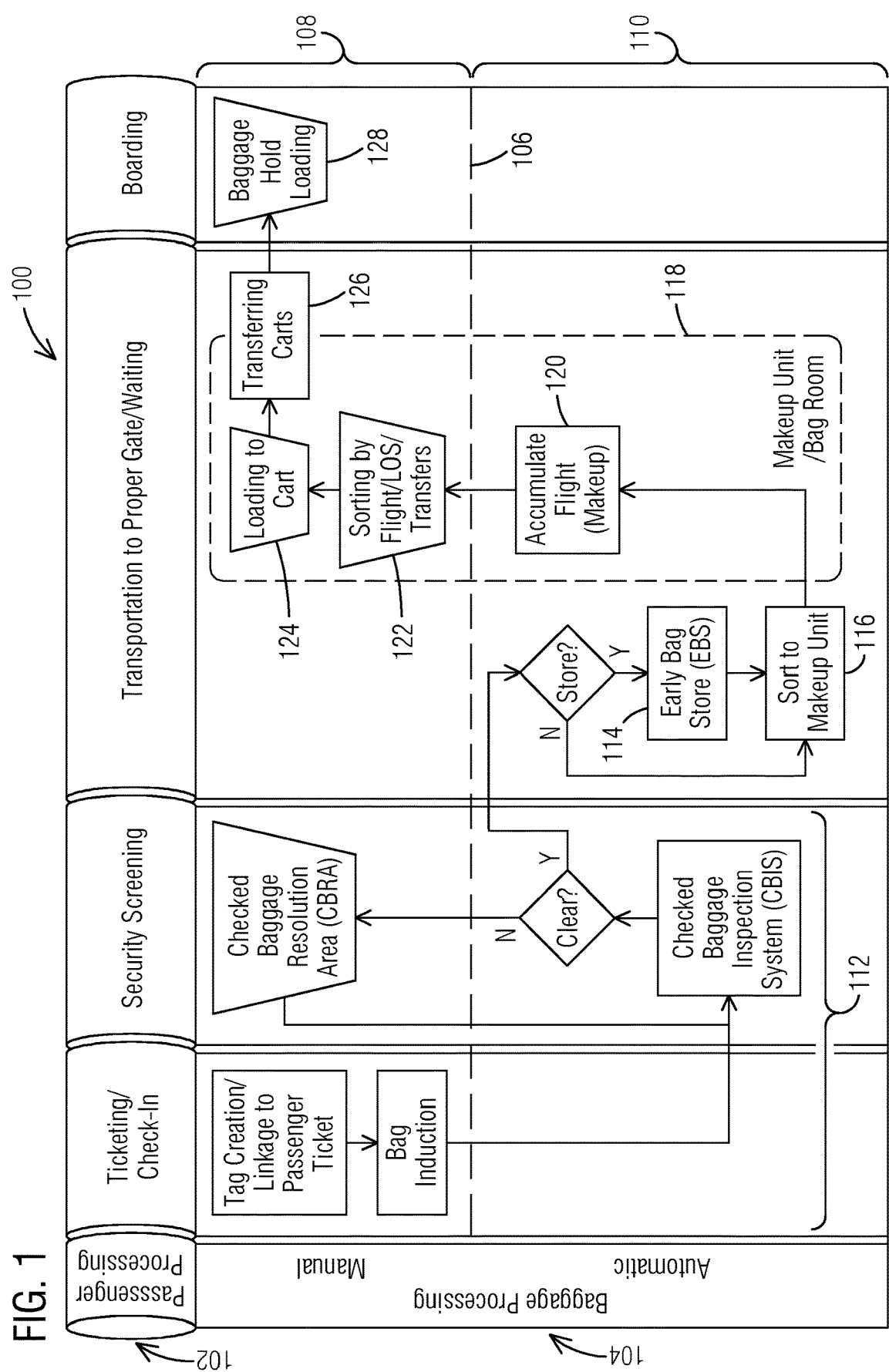
FIG. 1 is a flowchart illustrating a baggage processing workflow in parallel with passenger boarding steps in an airport.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Outbound baggage processing at an airport begins at baggage check-in and concludes after loading the checked-in baggage items aboard a passenger aircraft.

FIG. 1 illustrates a flowchart 100 where the essential passenger process 102 is depicted at the top, and the principle baggage processing workflow 104 is depicted underneath. As shown, at least a portion of the baggage processing workflow 104 may be automated. In this example, the portion 108 of the workflow 104 that is above the line 106 is manually executed, while the portion 110 of the workflow 104 that is below the line 106 is substantially automated.

The initial set of steps 112 of the baggage processing workflow 104 includes checking-in of baggage items where a tag is created for each checked-in baggage item and linked to a passenger ticket, induction of the checked-in baggage items, screening of the checked-in baggage items and resolution of baggage items that were not cleared by the screening. If storage is required, the baggage items are moved to an early bag store (EBS) 114. Storage of baggage items may be required, for example, in case of overnight layovers. In many modern airports, especially in international hubs, the EBS 114 is completely automated and may be used for all checked-in baggage items. Automated EBS is essentially an automatic storage/retrieval system for baggage items that is typically situated between security screening (check in) and sorting.

In a first sorting step 116, baggage items retrieved from the EBS 114 (or in some cases, directly after screening) are sorted to an appropriate makeup unit (MU) 118, among a plurality of MUs in a bag room. The storage function 120 at the MU 118 is typically a combination of accumulating baggage items on a baggage carousel or runout and accumulation in carts. A cart may include, for example, a unit load device (ULD), or any other device capable of transporting baggage items to an aircraft for loading. A second sorting step 122 associates baggage items with flights and provides a sequence of loading according to their placement in a sequence of carts. In this second sorting step 122, baggage items are arranged to be loaded according to a first-in, last-out principle (FILO) so that the baggage items that are associated with premium service requirements or transfers are last in sequence of loading, making them first in sequence of unloading, and available earlier to premium passengers and for transfer to other flights.

At step 124, subsequent to the second sorting step 122, baggage items are loaded into carts. At step 126, the carts are transported to an aircraft. Finally, at step 128, baggage items are loaded into the aircraft from the carts.

While baggage processing includes large areas of automation, the area where automation has largely been resisted is in the bag room, which includes the MUs that collect mixed streams of baggage and sort them into baggage carts that are ready to be transported to aircraft for loading.

MU baggage sorting is based on a classical hierarchical structure of elements, including attributes related to the flight, issues of service privilege (1st class handling, etc.), and downstream transfers or connections. Each flight is assigned to a MU and a time slot within that MU. Typical time slots for the assigned MU may be 120 to 180 minutes or more prior to departure of the assigned flight. Typically, the MU is scheduled to close about 30 minutes prior to departure. This time can vary depending on the time it might take to deliver baggage items from the specific MU to the particular aircraft. The approximately 160-minute MU window far exceeds the time needed to sort and load the related baggage into carts. Productivity in the MU tends to be far less than rates that are achieved in similar industrial material handling applications, primarily due to the relatively long operational window, coupled with inefficiencies and poor ergonomics in the typical MU work environment.

FIG. 1 thus illustrates two storage functions, namely the EBS 114 and the MU 118. Efforts aimed at improving the productivity of the MU 118 have largely focused on capacity expansions of the centralized, automated EBS 114. An automated EBS 114 with adequate capacity and performance can shift a downstream baggage handling system from a push process to a pull process, with prescribed operating windows that can be tightened, thus improving utilization and efficiency. Improved utilization and efficiency in turn open the possibility for the use of loading technology to further improve productivity. Examples include articulating conveyors, or even robotics.

Expanding the centralized EBS 114 may lead to some challenges. For example, a massive centralized footprint is required to achieve adequate buffering. In addition, centralized EBS systems are typically designed around trays, often referred to as Individual Container System (ICS) components that are designed to provide a surface not only for transporting and storing, but also for sorting. This makes the containers significantly larger than the baggage items that they carry and increases the volume required to store each baggage item.

Most sorting processes, including MU sorting, remain downstream of the EBS 114 which leaves a significant gap in automation that would need to be bridged to provide compatibility with loading technology for optimal productivity gains.

To address some of the challenges outlined above, rather than expanding the EBS, an automated storage and retrieval capability may be implemented in the MU. To that end, U.S. patent application Ser. No. 16/944,655, hereby incorporated by reference, discloses a baggage processing system including a storage array having a plurality of storage cells from which baggage items are retrieved and placed on a loading device in a determined sequence to be loaded on to carts for being transferred to an aircraft.

According to aspects of the present disclosure, the storage capacity is implemented through the use of a multi-tiered carousel system with addressable storage cells. Having multiple tiers of carousels arranged at different heights increases the storage capacity of the carousel system. The storage capability is of a particular design that provides for baggage items to be individually requested from storage in an optimal sequence on a conveyor that terminates at a loading device. In this way, the same system is utilized for both storage/retrieval and sorting/sequencing, so that the output queue represents a correct sequence of baggage items that are ready to be loaded by the loading device on to carts for being transferred to the aircraft. The optimum sequence is a loading sequence that produces an approximate unloading sequence after the flight, based on the first-in, last-out (FILO) constraints of the operation, in accordance with priority level (e.g., transfers and level of service).

Like an expanded EBS-based design, the proposed baggage handling system converts the baggage handling process to a pull process, albeit with superior potential productivity improvement. This superiority is achieved by the capability of producing a predetermined sequence of baggage items at the loading point. Moreover, the proposed baggage handling system obviates the need for an oversized EBS, and potentially, the need for any EBS altogether, thereby providing an improved use of space within the airport, particularly in the bag room. Furthermore, the proposed baggage handling system allows that the space roughly equivalent to the bag room be reallocated from excessive carts clustered around conveyors and carousels to efficient, high capacity storage and handling. In addition, far fewer baggage carts and workers may be necessary.

Referring now to FIG. 2 and FIG. 3, a baggage handling system 200 is described in accordance with an example embodiment. FIG. 2 depicts a plan view (top view) while FIG. 3 depicts a side elevation view of the described baggage handling system 200. As shown, the baggage handling system 200 broadly includes a multi-tiered carousel system 202, an input conveyor system 204, an output conveyor system 206 and a control system 208. The multi-tiered carousel system 202 serves as a storage array with addressable storage locations where individual baggage items can be stored. The input conveyor system 204 transfers incoming baggage items selectively to the addressable storage locations of the multi-tiered carousal system 202. The output conveyor system 206 retrieves baggage items selectively from the addressable storage locations of the multi-tiered carousal system 202 and places them in a queue. The control system 208 controls the selective storage and retrieval of baggage items such that the retrieved baggage items are queued in a determined sequence for downstream handling.

As shown in FIG. 2 and FIG. 3, the multi-tiered carousel system 202 comprises multiple tiers of carousels arranged at different heights. In the shown example, four tiers of carousels are depicted, namely, T1, T2, T3 and T4. Each tier comprises an array of storage cells 210, where each storage cell 210 is uniquely addressable. The address of a storage cell would typically identify the particular tier in which it is located, as well as its position in the storage array of the particular tier. Each storage cell 210 stores a single checked-in baggage item 218 to ensure that the address of the storage cell 210 associated with each checked-in baggage item is known by the control system 208.

The storage cells 210 of each tier are movable along a loop having a charge point 212 and discharge point 214. A charge point 212, for a given tier, is a fixed location where a baggage item 218 is transferred to a storage cell 210 by the input conveyor system 204 when the storage cell 210 is temporarily at that location or passes by that location. A discharge point 214, for a given tier, is a fixed location where a baggage item 218 is retrieved from a storage cell 210 by the output conveyor system 206 when the storage cell 210 is temporarily at that location or passes by that location.

Figure 5:
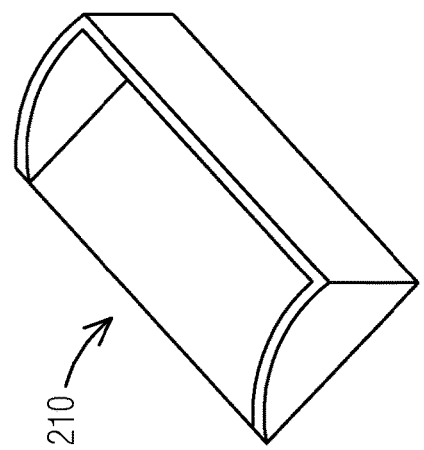
FIG. 5 is a perspective view of a receptacle used as a storage cell in accordance with an example embodiment.
Figure 6A:
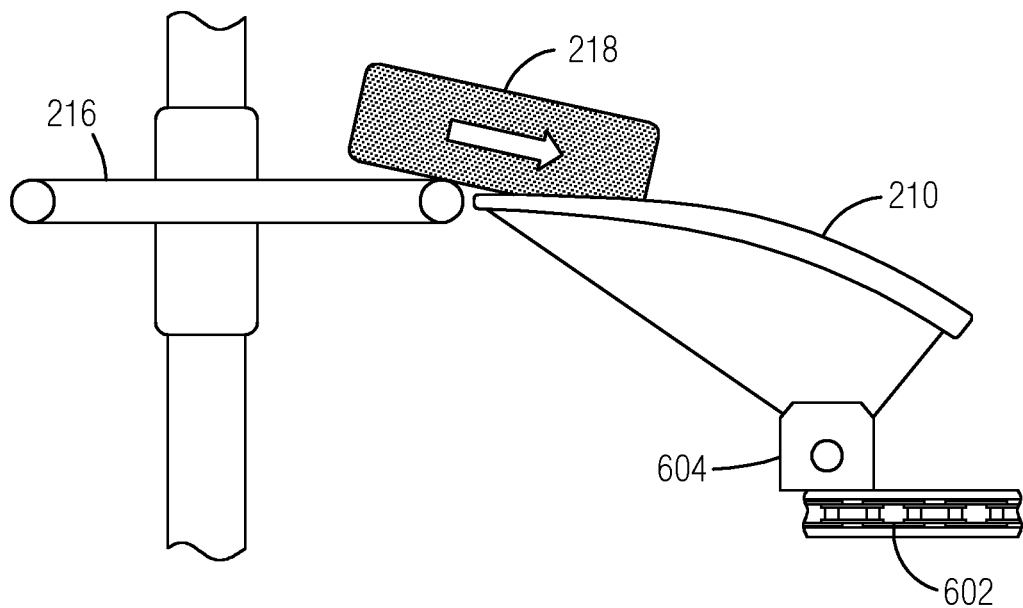
FIG. 6A and FIG. 6B respectively illustrate a receiving position and a dispensing position of a pivoted receptacle.
Figure 6B:
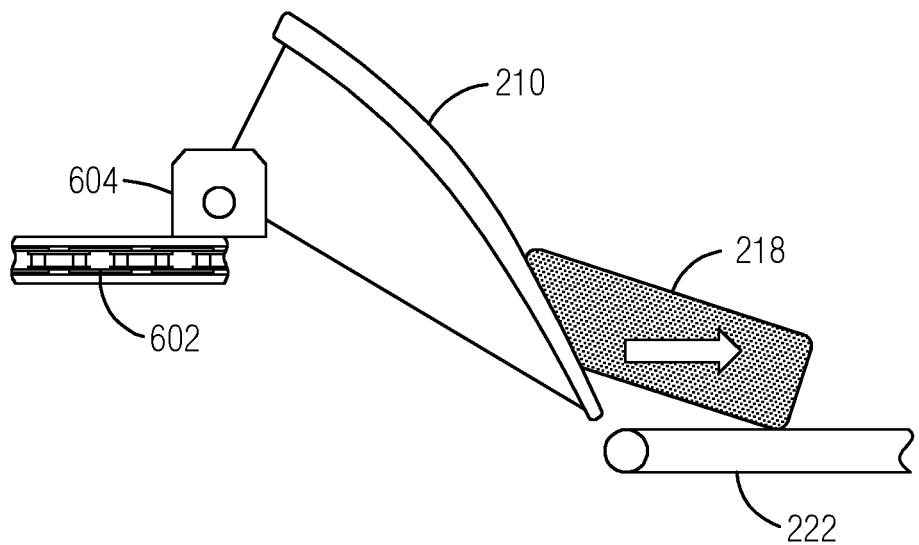

In one embodiment, the storage cells 210 may be realized by individual receptacles, as shown in FIG. 5. Each receptacle 210 is sized store a single baggage item (e.g., standard or oversized). The receptacles 210 may be mounted at fixed points on a rotating frame driven by a carousel mechanism. In an example construction, as shown in FIGS. 6A and 6B, the receptacles 210 are mounted along an outer periphery of the carousel frame 602. To enable transfer and retrieval of individual baggage items 218, the receptacles 210 are pivoted at the mounting points 604. This allows the receptacle 210 to be tilted from a first position (see FIG. 6A) to receive a baggage item 218, for storage therein, to a second position (see FIG. 6B) to dispense the stored baggage item 218. The pivoting mechanism biases the receptacle 210 to remain in the first position when it is empty and when storing a baggage item 218, and causes the receptacle 210 to tilt temporarily to the second position when a stored baggage 218 item is to be dispensed at the discharge point. In various other constructions, the storage cells 210 may be realized without receptacles or containers, for example, by allocating discrete addressable storage locations in a standard baggage carousel (e.g., flat plate or inclined carousels as used in an airport baggage claim) and using diverters at the discharge point.

In one embodiment, the storage cells 210 of at least one of the tiers are differently sized in relation to storage cells of the other tiers. In the shown embodiment (see FIG. 3), the lowest tier T1 is allocated for oversized baggage items, whereby the storage cells 210 in the lowest tier T1 are larger than those in the upper tiers T2-T4.

Continuing with reference to FIGS. 2 and 3, the input conveyor system 204 in the shown embodiment includes an elevator 216. The charge points 212 of the multiple tiers are located such that they are aligned in the vertical direction, allowing the elevator 216 to travel to each of the charge points 212 for transferring baggage items for storage. The elevator 216 receives baggage items 218 individually from an incoming queue of baggage items on an input queueing conveyor 220. In the shown configuration, a transfer conveyor 230 is used for transferring baggage items 218 to the elevator 216 from the input queuing conveyor 220, at right angles to the direction in which they are received from the input queueing conveyor 220. The elevator 216 then vertically transports each individual baggage item 218 to the charge point 212 of a selected tier and transfers the individual baggage item 218 to a selected storage cell 210 of the selected tier.

As baggage items become known to the control system 208 after check-in (typically well in advance of their arrival at the MU), the control system 208 may begin to continually optimize the appropriate sequence of the baggage items, a process that may be allowed to continue for a single flight up until checked-in baggage items are no longer being accepted. Meanwhile, the sequence of baggage items checked-in, potentially altered in systems in which an EBS is used, determines the order of baggage items that arrive in the input queueing conveyor 220, and is unrelated to the actual sequence needed for loading.

Baggage items 218 are introduced into the multi-tiered carousel system 202 for storage as they arrive in the MU via the input queueing conveyor 220. The storage address assigned to an incoming baggage item 218 may be determined by the control system 208, for example based on the size of the baggage item 218, its possible position in the output queue (which depends on the flight and priority level), among other factors. In some embodiments, the address assignment is optimized to ensure that the wait times of the elevator 216 as well as delays at the discharge point 214 are minimized. The baggage items 218 in storage may typically be assigned to one of multiple flights. The stored baggage items 218 are retrieved, as described below, based on their addresses stored by the control system 208 for subsequent loading to carts.

The storage and retrieval operation may be controlled such that the transfer of individual baggage items to storage cells at the charge points and the retrieval of individual baggage items from storage cells at the discharge points are carried out with the carousels in continuous unidirectional motion. In various other embodiments, depending on the control method used, the carousels may be moved discontinuously in a stop-and-go manner and/or moved bi-directionally (forward and reverse).

Figure 4:
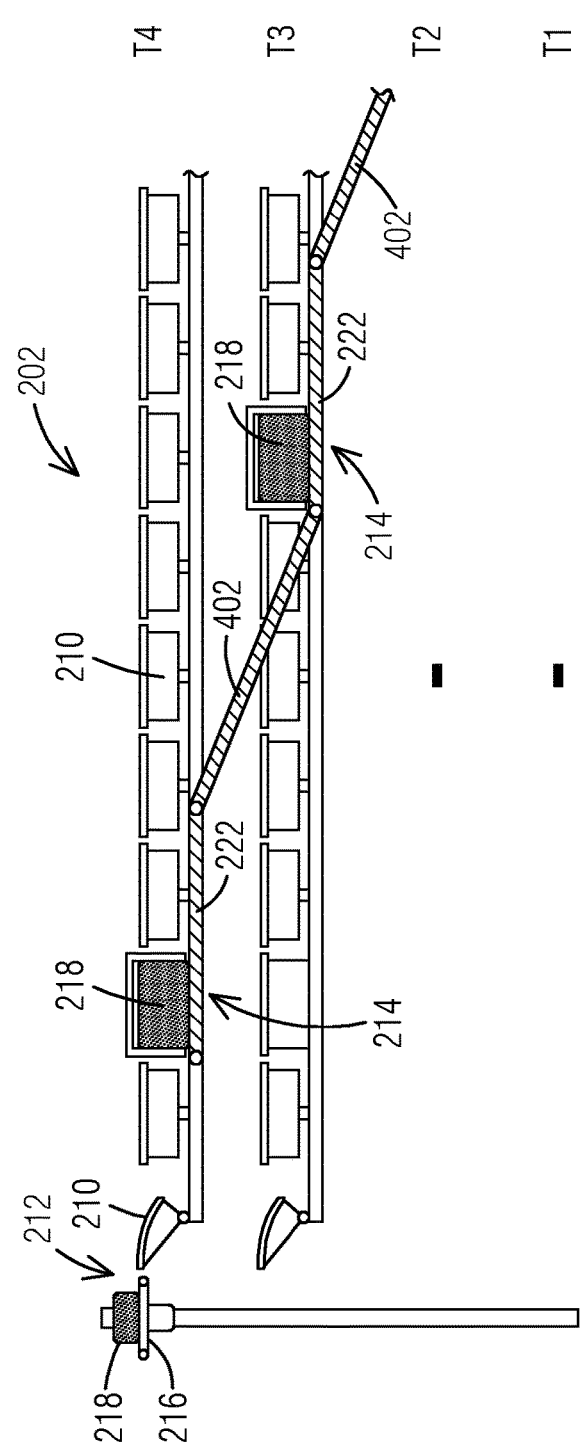
FIG. 4 illustrates an elevation view of portion of a baggage handling system according to a second embodiment.

The output conveyor system 206 in the shown embodiment includes a plurality of discharge conveyors 222. Each discharge conveyor 222 is positioned at a different height at the discharge point 214 of a respective tier. In the embodiment shown in FIG. 2-3, the output conveyor system 206 further includes a vertical merge conveyor 224 configured to merge baggage items 218 retrieved by the discharge conveyors 222 of the multiple tiers into a single queue of baggage items 218, which is delivered to an output queueing conveyor 226. The vertical merge may be realized, for example, by providing cantilevered boom sections 302 (see FIG. 3). Each boom section 302 may be pivotable, by the weight of a baggage item or by powered actuation, to incline downward to release the retrieved baggage item from a higher level to a merge level where the retrieved baggage items are queued. Subsequent to the release, the boom section 302 returns to a horizontal orientation. In an alternate embodiment, as shown in FIG. 4, the discharge conveyors 222 at the different heights may be connected in series by interconnecting ramped conveyor sections 402 that are inclined to the horizontal, whereby baggage items 218 retrieved by the discharge conveyors 222 of the multiple tiers are transported in a single queue. In this case, the discharge conveyors 22 at the different heights are offset (i.e., not vertically aligned) in relation to each other. The ramp angle shown in FIG. 4 is exaggerated for the purpose of illustration, it being understood that the ramp angle would be typically much shallower in practice.

Turning back to FIG. 2-3, the output queueing conveyor 226 delivers a queue of baggage items 218 retrieved from the multi-tiered carousel system 202 to a loading point. At the loading point, a loading device or loader 228 may be provided, to load the queued baggage items 218 in the determined sequence into carts (not shown) for being transported to an aircraft. The loader 228 may include, for example, a telescoping conveyor configured to bridge the gap between the output queuing conveyor 226 and the cart. Furthermore, the loader 228 may be controllable by the control system 208 to direct the baggage items 218 toward the cart, to eliminate manual lifting of the baggage items 218 by an operator at the loading point.

As described in greater detail in U.S. patent application Ser. No. 16/944,655, the control system 208 may be configured to prepare a sequenced list of baggage items for loading into carts based on a number of factors, including some or all of the following factors: a) schedule of loading conveyor availability, b) information on planned flights, c) closing times for flights, d) estimated cart capacity, e) estimated cart loading times, f) estimated aircraft baggage hold loading times, g) information on downstream flight connections; and h) information on layover times associated with downstream flight connections. The sequenced list of baggage items is sorted by flight, and further sorted by priority levels within the particular flight, such that all baggage items associated with a particular priority level of a particular flight are arranged in a continuous sequence in the output queue. The priority level may be dependent, for example, on one or more of: service class associated with baggage items, baggage items subject to transfer, and baggage items subject to tail-to-tail operations at the destination airport (moving baggage items directly from an arriving aircraft to a departing aircraft circumventing the centralized baggage handling system). The sequencing of baggage items may thus encompass a hierarchy of multiple flights and multiple priority levels.

The term "sequence", as used in this specification, refers to a sequencing of groups of baggage items, where the position of individual baggage items within a group is not critical. The determined sequence ensures that baggage items are arranged to be loaded according to a first-in, last-out principle (FILO) so that the group(s) of baggage items that are associated with premium service requirements or transfers are last in sequence of loading, making them first in sequence of unloading, and available earlier to premium passengers and for transfer to other flights.

The control system 208 may comprise a computer system capable for coordinating the overall operation of baggage handling system 200, including assignment of storage addresses for incoming baggage items, controlling the storage of baggage items into storage cells of the multi-tiered carousel system based on the assignment of addresses, determining a sequenced list of baggage items for loading, and controlling the retrieval of baggage items from storage to produce an output queue of baggage items that conforms to the determined sequence. For example, to realize the described functions, the computer system may interact directly or indirectly with components such as device controllers (e.g., PLC), sensors, actuators, motors, encoders, scanners, intermediate I/O systems used for aggregation and distribution of input and output signals, etc.

Figure 7:
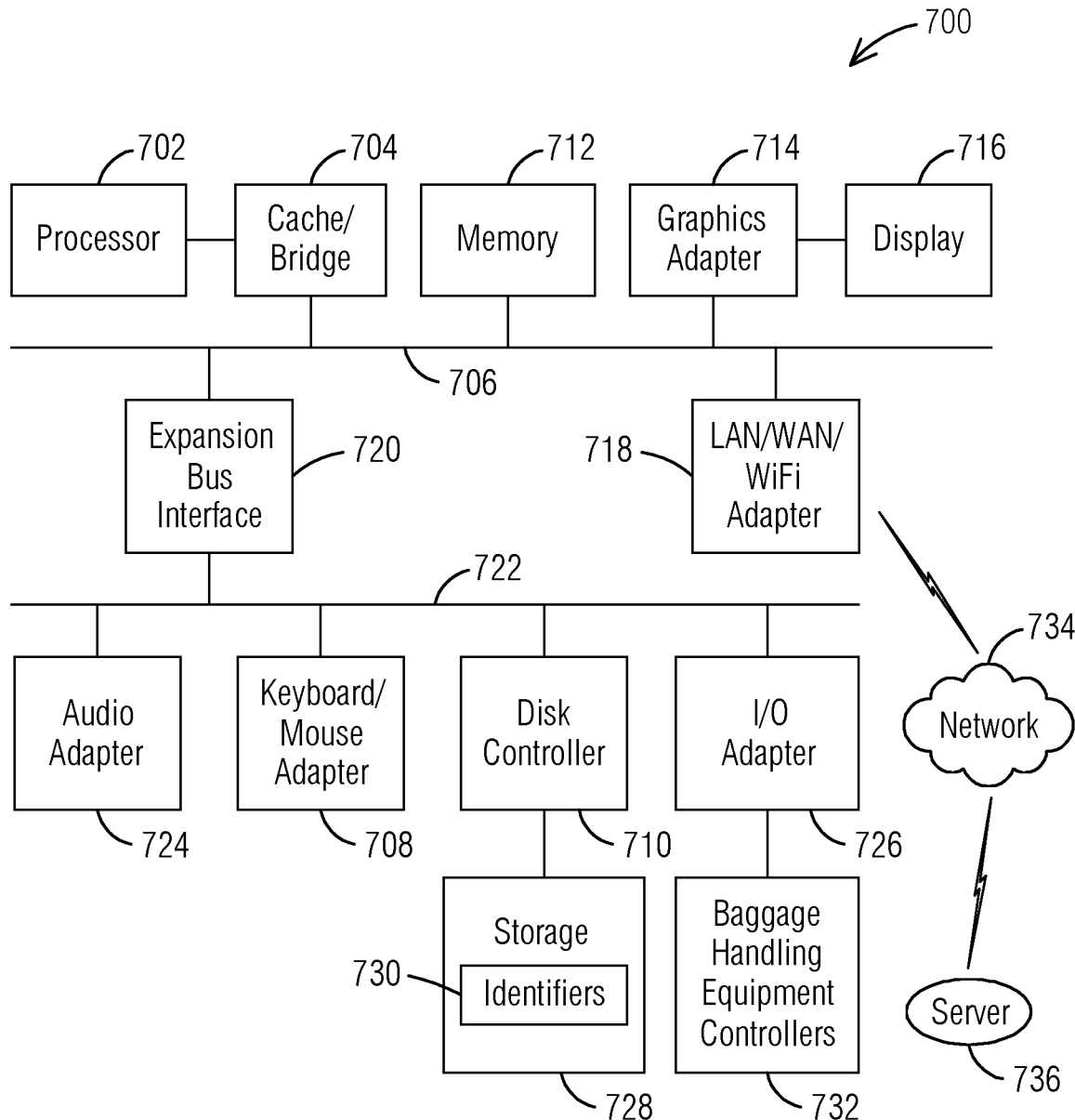
FIG. 7 illustrates a block diagram of a data processing system with which an embodiment can be implemented.

FIG. 7 illustrates a block diagram of a data processing system 700 with which an embodiment can be implemented, for example, as control system 208, or other device configured by software or otherwise to perform the processes as described herein, and in particular as each one of a plurality of interconnected and communicating systems as described herein. The data processing system 700 depicted includes a processor 702 connected to a level two cache/bridge 704, which is connected in turn to a local system bus 706. Local system bus 706 may be, for example, a peripheral component interconnect (PCI) architecture bus. Also connected to local system bus 706 in the depicted example are a main memory 712 and a graphics adapter 714. The graphics adapter 714 may be connected to display 716.

Other peripherals, such as a LAN/WAN/Wireless adapter 718, may also be connected to local system I/O bus 722. Expansion bus interface 514 connects local system bus 706 to input/output (I/O) bus 418. I/O bus 722 is connected to keyboard/mouse adapter 708, disk controller 710, and I/O adapter 726. Disk controller 710 can be connected to a storage 728, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 728 can store any data or executable instructions useful in performing processes as described herein, including in particular the identifiers 730 discussed above.

I/O adapter 726 is connected to control baggage handling equipment controllers 732, which can be used to control individual elements of the described baggage handling system.

Also connected to I/O bus 722 in the example shown is audio adapter 724, to which speakers (not shown) may be connected for playing sounds. Keyboard/mouse adapter 708 provides a connection for a pointing device (not shown), such as a mouse, trackball, trackpointer, touchscreen, etc.

Those of ordinary skill in the art will appreciate that the hardware depicted in FIG. 7 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 718 can be connected to a network 734 (not a part of data processing system 700), which can be any public or private data processing system network or combination of networks, as known to those of skill in the art, including the Internet. Data processing system 700 can communicate over network 734 with server system 736, which is also not part of data processing system 700, but can be implemented, for example, as a separate data processing system 700.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

Although an exemplary embodiment of the present disclosure has been described in detail, those skilled in the art will understand that various changes, substitutions, variations, and improvements disclosed herein may be made without departing from the spirit and scope of the disclosure in its broadest form. In particular, the features and operations of various examples described herein and in the incorporated applications can be combined in any number of implementations.

The system and processes of the figures are not exclusive. Other systems and processes may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A baggage handling system comprising:
    a carousel system comprising multiple tiers of carousels arranged at different heights, each tier comprising an array of addressable storage cells movable along a loop having a charge point and a discharge point, each storage cell configured to store a single baggage item,
    an input conveyor system configured to transfer baggage items selectively to the addressable storage cells of the multiple tiers at the respective charge points, for storage therein,
    an output conveyor system configured to retrieve baggage items selectively from the addressable storage cells of the multiple tiers at the respective discharge points and convey the retrieved baggage items in a queue, and
    a control system configured to control the storage and retrieval of baggage items such that the retrieved baggage items are queued to conform to a determined sequence,
    wherein each storage cell comprises a pivoted receptacle configured to be tilted from a first position to receive a baggage item, for storage therein, to a second position to dispense the stored baggage item.

2. The baggage handling system of claim 1, wherein the input conveyor system comprises an elevator configured to receive baggage items individually from an incoming queue of baggage items, vertically transport each individual baggage item to the charge point of a selected tier and transfer the individual baggage item to a selected storage cell of the selected tier.

3. The baggage handling system of claim 1, wherein the output conveyor system comprises a plurality of discharge conveyors, each positioned at a different height to retrieve baggage items at the respective discharge points.

4. The baggage handling system of claim 3, wherein the output conveyor system comprises a vertical merge conveyor configured to merge baggage items retrieved by the discharge conveyors of the multiple tiers into a single queue of baggage items.

5. The baggage handling system of claim 3, wherein the discharge conveyors at the different heights are connected in series by interconnecting ramped conveyor sections, whereby baggage items retrieved by the discharge conveyors of the multiple tiers are transported in a single queue.

6. The baggage handling system of claim 1, comprising a loading device configured to load the queued baggage items retrieved by the output conveyor system, in the determined sequence, into carts for being transported to an aircraft.

7. The baggage handling system of claim 1, wherein the control system is configured to determine the sequence of the baggage items by a hierarchical sorting based on flights and priority levels within a particular flight.

8. The baggage handling system of claim 1, wherein the storage cells of at least one of the tiers are differently sized in relation to storage cells of the other tiers.

9. The baggage handling system of claim 1, wherein the control system is configured to control the storage and retrieval of baggage items such that the transfer of individual baggage items to storage cells at the charge points and the retrieval of individual baggage items from storage cells at the discharge points are carried out with the carousels in motion.

10. A baggage handling system comprising:
    a carousel system comprising multiple tiers of carousels arranged at different heights, each tier comprising an array of addressable storage cells movable along a loop having a charge point and a discharge point, each storage cell configured to store a single baggage item, an input conveyor system configured to transfer baggage items selectively to the addressable storage cells of the multiple tiers at the respective charge points, for storage therein, an output conveyor system configured to retrieve baggage items selectively from the addressable storage cells of the multiple tiers at the respective discharge points and convey the retrieved baggage items in a queue, and a control system configured to control the storage and retrieval of baggage items such that the retrieved baggage items are queued to conform to a determined sequence, wherein the output conveyor system comprises a plurality of discharge conveyors, each positioned at a different height to retrieve baggage items at the respective discharge points, and wherein the output conveyor system comprises a vertical merge conveyor configured to merge baggage items retrieved by the discharge conveyors of the multiple tiers into a single queue of baggage items.

11. A baggage handling system comprising:

a carousel system comprising multiple tiers of carousels arranged at different heights, each tier comprising an array of addressable storage cells movable along a loop having a charge point and a discharge point, each storage cell configured to store a single baggage item, an input conveyor system configured to transfer baggage items selectively to the addressable storage cells of the multiple tiers at the respective charge points, for storage therein, an output conveyor system configured to retrieve baggage items selectively from the addressable storage cells of the multiple tiers at the respective discharge points and convey the retrieved baggage items in a queue, and a control system configured to control the storage and retrieval of baggage items such that the retrieved baggage items are queued to conform to a determined sequence, wherein the output conveyor system comprises a plurality of discharge conveyors, each positioned at a different height to retrieve baggage items at the respective discharge points, and wherein the discharge conveyors at the different heights are connected in series by interconnecting ramped conveyor sections, whereby baggage items retrieved by the discharge conveyors of the multiple tiers are transported in a single queue.

\* \* \* \* \*